Figure 7:
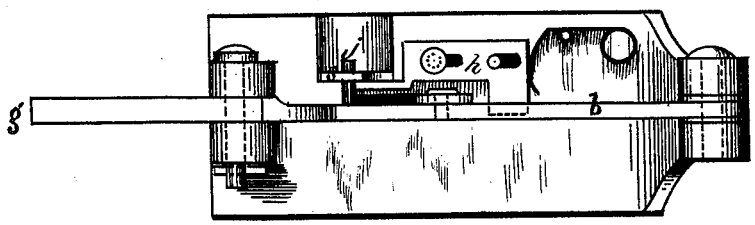

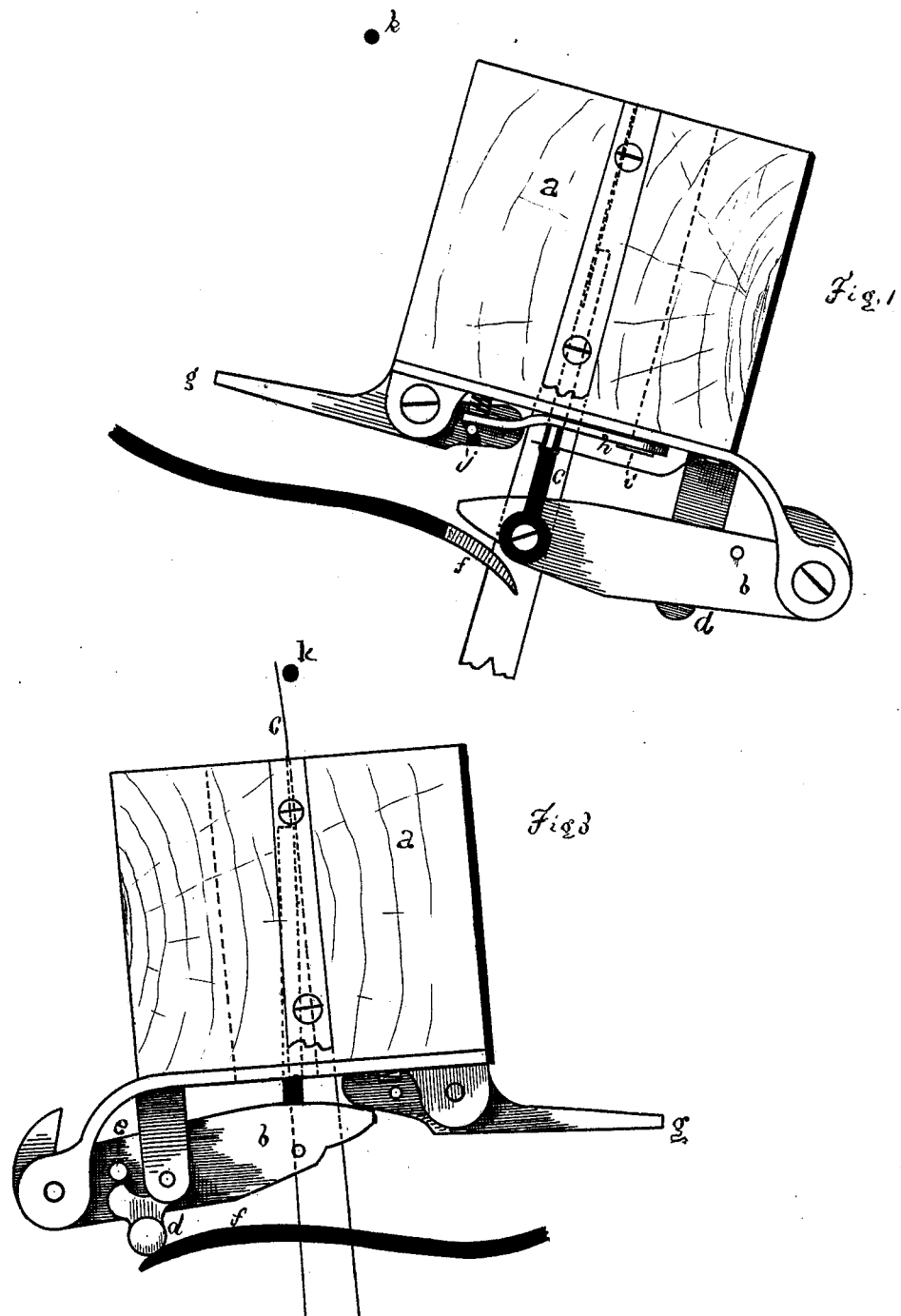

4 Sheets—Sheet 2.
F. O. TUCKER.
WEFT-STOP MECHANISM.
No. 174,928. Patented March 21, 1876.
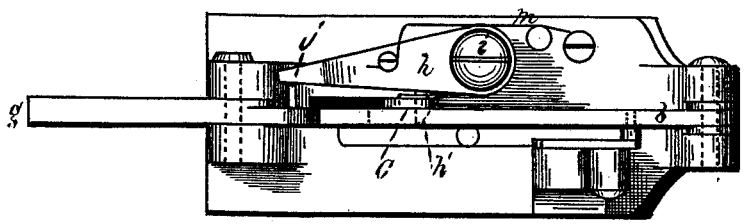
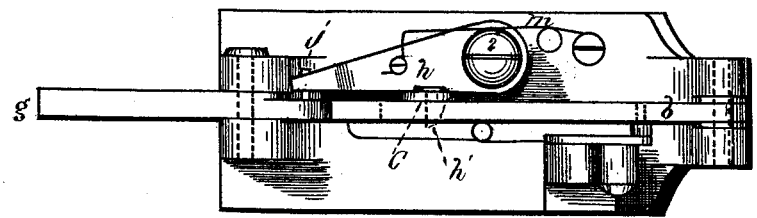
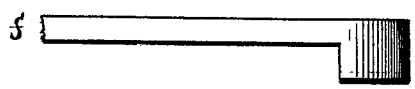
Witnesses
John Pollitt
R F Gaylord
Inventor
Frederick O. Tucker
By W. E. Simonds
Att'y 4 Sheets—Sheet 3.

F. O. TUCKER.
WEFT-STOP MECHANISM.

No. 174,928. Patented March 21, 1876.

Witnesses.
John Pollitt
R. F. Gaylord

Inventor
Frederick O. Tucker
By W. E. Simonds
Atty

4 Sheets—Sheet 4.
F. O. TUCKER.
WEFT-STOP MECHANISM.
No. 174,928. Patented March 21, 1876.
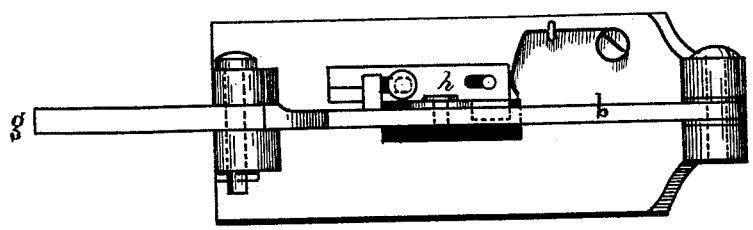
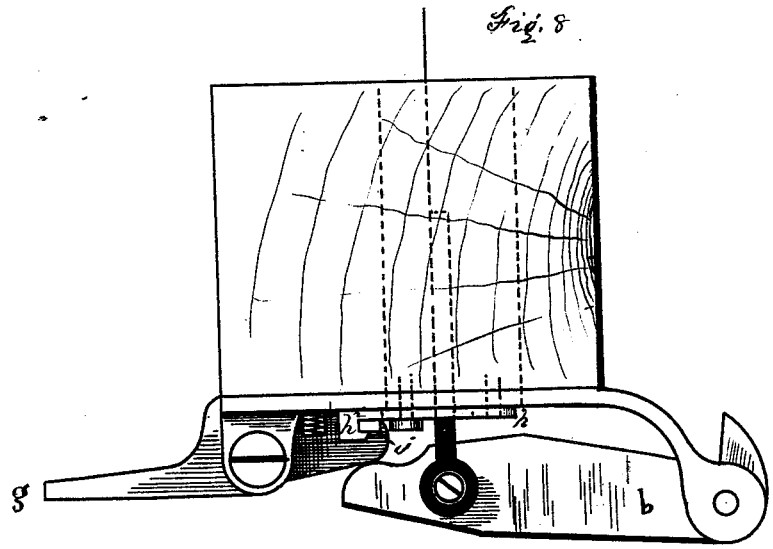
Witnesses.
John Pollitt
R. F. Gaylord
Inventor
Frederick O. Tucker
By W. E. Simonds
Atty

UNITED STATES PATENT OFFICE.

FREDERICK O. TUCKER, OF HARTFORD, CONNECTICUT.

IMPROVEMENT IN WEFT-STOP MECHANISMS.

Specification forming part of Letters Patent No. 174,928, dated March 21, 1876; application filed November 29, 1875.

*To all whom it may concern:*

Be it known that I, FREDERICK O. TUCKER, of Hartford, in the county of Hartford and State of Connecticut, have invented certain new and useful Improvements pertaining to Weft-Stop Motion for Looms, of which the following is a specification, reference being had to the accompanying drawing, where—

Figure 1 is a side view of the operating parts when the lathe-beam is at the rear limit of its play. Fig. 2 is a bottom view of same. Fig. 3 is a side view of same parts from opposite side, the dog just mounting the stationary cam. Fig. 4 is a bottom view of the same as Fig. 2, except that the rear end of the "dagger" is locked. Fig. 5 is a top view of the stationary cam. Figs. 6, 7, 8, 9 are views of modifications, and will be hereinafter referred to.

The letter $a$ denotes the lathe-beam; $b$, lever pivoted thereunder; $c$, comb of wires pivoted to lever $b$ and reciprocating through lathe-beam; $d$, a dog pivoted to side of lever $b$, and so acting in conjunction with pin $e$ that when the lathe-beam swings forward this dog mounts the cam $f$, attached to the breast-beam, and lifts the free end of lever $b$. $g$ denotes a pivoted dagger, the rear end of which is raised, and the front end correspondingly lowered, by the upward movement of the lever $b$, as shown in Fig. 3; $h$, a locking-piece pivoted on pin $i$, which rests in its normal position (shown in Fig. 2) when the lathe first starts forward, but which is swung to position shown in Fig. 4 as the lathe beam moves farther forward, (provided the weft-thread is right and unbroken,) by the comb $c$ striking against the arm $h'$ in such position, swinging its front end under the pin $j$, and thus holding the front end of the dagger locked in its lowest position. The letter $k$ denotes the weft-thread on which the comb operates. Supposing the weft-thread to be in its proper place and unbroken, the operation of the parts during a complete back-and-forth vibration of the lathe, starting from the rear limit of its play, is as follows: As the lathe swings forward the dog $d$ mounts the cam $t$ and lifts the free end of the lever $b$, which strikes and raises the rear end of the dagger $g$, correspondingly depressing the lower end, so that it will not strike and operate the belt-shifting mechanism, and thereby stop the loom. As the lathe moves farther forward the upper end of comb $c$ strikes the fresh weft-thread $k$, and the effect thereof is to hold the comb stationary, so to speak, while the lathe moves forward, causing the arm $h'$ to strike against the comb and thereby swing the front end of the locking-piece $h$ under the pin $j$, which is on the dagger, which holds the dagger with its front end locked down. When the lathe swings backward the dog $d$ returns over the stationary cam without lifting lever $b$. All this time—that is, during the swing from front to rear—the dagger remains thus locked, but the moment that, on the swing from rear to front, the lever $b$ moves upward it lifts the pin $j$ off the locking-piece $h$, which then, actuated by the spring $m$, swings to position shown in Fig. 2, and hereby unlocks the dagger. The spring $n$ throws the front end of the dagger up, when not prevented. If, as the lathe moves farther forward, the fresh weft-thread is found broken, and does not arrest the upper end of the comb, the locking-piece $h$ is not swung into locking position, so that when the lever $b$ falls the front end of the dagger flies upward and, at the forward limit of the play of the lathe, strikes the shipping mechanism by old methods, and stops the loom.

Figure 6:
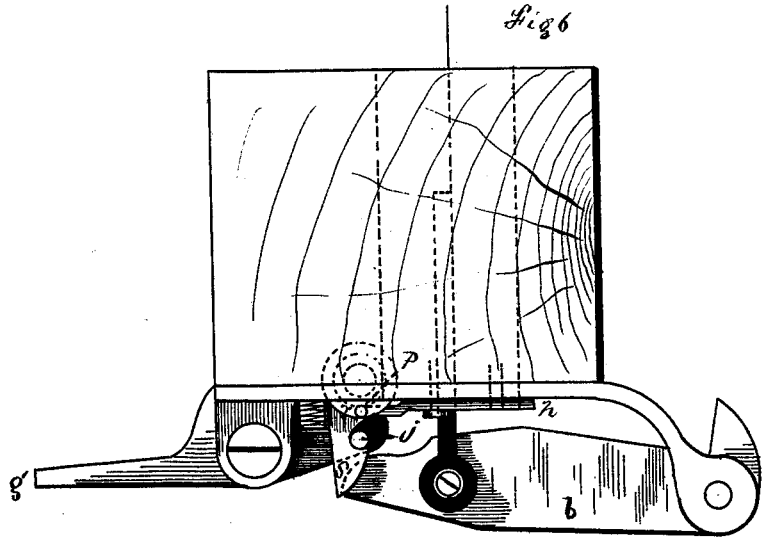

Fig. 6 is a side view of a modification. Fig. 7 is a bottom view of same.

The operation of the parts is the same as just described, except that, in place of swinging on a pivot, the locking-piece $h$ reciprocates in a right line with the movements of the comb, and, by means of the pin P, gives corresponding rotary reciprocation to the disk $r$ and its hook $s$, which acts in connection with pin $j$.

Fig. 8 is a side view of another modification. Fig. 9 is a bottom view of same. Here the locking-piece $h$ slides as in the last-described modification, but has upon it a hook, $h^2$, which operates in connection with pin $j$.

I claim as my invention—

In combination with the lay, the lever $b$, and operating mechanism, comb $c$, locking-piece $h$, and dagger $g$, all substantially as described.

FREDERICK O. TUCKER.

Witnesses:
R. F. GAYLORD,
GEORGE G. SILL.